Jan. 5, 1937.                C. S. COMSTOCK                 2,066,335
                          TOWEL RACK ATTACHMENT
                           Filed June 29, 1935
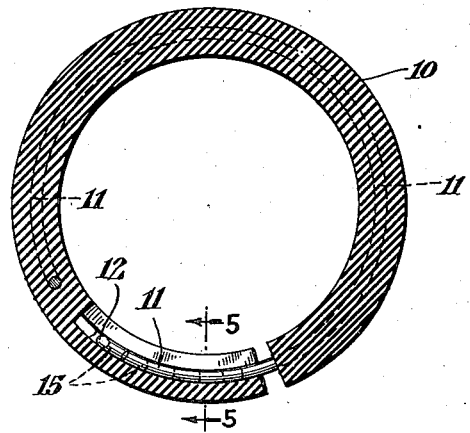
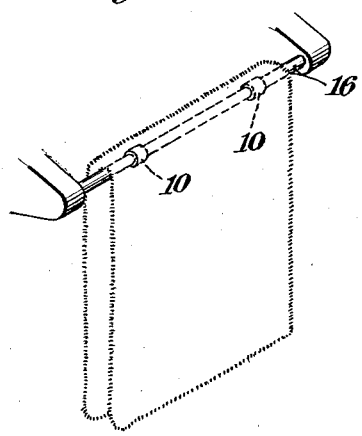
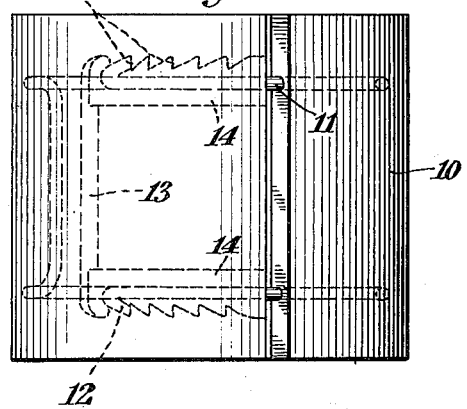
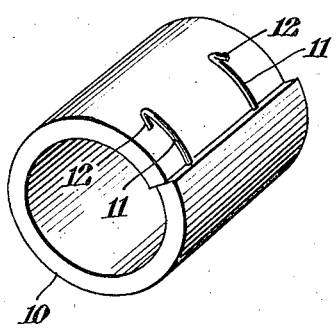
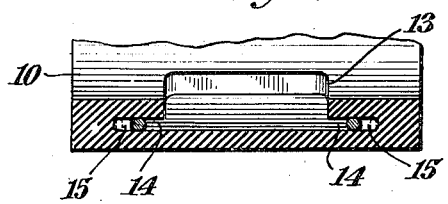
INVENTOR
Clark S. Comstock
BY
Kenyon & Kenyon
ATTORNEYS Patented Jan. 5, 1937

2,066,335

UNITED STATES PATENT OFFICE 2,066,335

TOWEL RACK ATTACHMENT

Clark S. Comstock, Great Barrington, Mass.

Application June 29, 1935, Serial No. 29,017

4 Claims. (Cl. 211—123)

This invention relates to friction devices for towel racks and has for an object to provide a simple, inexpensive and easily applied towel rack attachment which will effectively prevent towel slippage and which when applied to a towel rack is securely locked thereon.

An attachment embodying the invention consists of a split rubber sleeve having a spring-metal insert which is operative to lock the sleeve around a rod to which it is applied. The locking means are so arranged that they are brought into operative relation by the act of applying the sleeve around the rod and are inaccessible after the sleeve has been applied, thus preventing removal thereof. This feature is of importance in connection with the use of such devices in hotels, inns, etc. to prevent theft of the same since the device is adapted for application to previously installed towel racks.

Other objects, novel features and advantages of this invention will become apparent from the following specification and accompanying drawing, wherein:

Fig. 1 is a perspective view of a towel rack equipped with attachment embodying the invention;

Fig. 2 is a perspective view of an attachment;

Fig. 3 is a transverse section through the attachment;

Fig. 4 is a plan view thereof, and

Fig. 5 is a section on the line 5—5 of Fig. 3.

The attachment consists of a split rubber sleeve 10 of any suitable length, but is preferably of 1½" to 2" in length. Within the sleeve 10 is molded a U-shaped insert 11 of spring wire bent into the form of a ring and having its ends projecting beyond one edge of the sleeve 10. The insert 11 is so tensioned as to tend to move the edges of the sleeve toward each other. Hooks 12 are provided on the ends of the insert 11. The bight of the U-shaped insert 11 is set back from the remaining edge of the sleeve and between the bight and the edge of the sleeve there is provided a groove 13 opening into the interior of the sleeve and terminating at the edge of the sleeve. This groove is formed with undercut recesses 14 in which are provided notches 15 to be engaged by the hooks 12 to lock the sleeve in closed condition.

The attachment is applied to a towel rod 16 simply by opening the sleeve sufficient to pass it over the rod and then closing the sleeve around the rod with the insert ends extending into the undercut portions 14 of the groove 13. The hooks 12 engage in notches 15 and lock the sleeve around rod. The provision of a plurality of notches 15 permits application of the sleeve to rods of slightly varying diameter. The hooks 12 are inserted into the grooves 14 to such an extent that the sleeve grips the rod, thus preventing movement of the sleeve on the rod and the exterior rubber surface provides friction for preventing slippage of towels hung on the rack. After the sleeve has once been applied to a rod it is firmly locked in place and cannot be removed without the use of tools or without damage to it, thus effectively deterring the unauthorized removal of the same. Pilfering of the device from hotel rooms and the like is thus prevented.

Should the hooks 12 be accidentally engaged with the notches 15 before the attachment has been applied to a towel rack, disengagement of the hooks 12 from the notches 15 can easily be effected by means of a suitable tool inserted into the groove 13. Thus, if in demonstrating the device it has accidentally become locked, such condition may be rectified.

It is, of course, apparent that modifications may be made in the structure of the device above described without in any way departing from the spirit of the invention as defined in the appended claims.

I claim:

1. A friction attachment for a towel rack comprising a split rubber sleeve having a recess in one edge, a metal insert in said sleeve having a portion projecting beyond the other edge and being receivable in said recess, and inter-engaging means on said insert and sleeve for locking the sleeve around the rod.

2. A friction attachment for a towel rack comprising a split rubber sleeve, metal members extending from one sleeve edge, recesses in the other sleeve edge to receive said members, hooks on the ends of said members, and notches in said sleeve for engagement by said hooks.

3. A friction attachment for a towel rack comprising a split rubber sleeve having its inner surface provided with a groove terminating at one edge, a metal insert in said sleeve having extensions projecting from the other edge and being received in said groove, hooks at the end of said extensions and notches in the sides of said groove for engagement by said hooks to lock the sleeve around a rod.

4. A friction attachment for a towel rack comprising a split rubber sleeve having its inner surface provided with a groove terminating at one edge, a U-shaped wire insert in said sleeve having its legs bent into circular configuration with the ends extending beyond the other edge of the sleeve and being received in said groove, hooks on said projecting ends and notches in the sides of said groove for engagement by said hooks to lock the sleeve around a rod.

CLARK S. COMSTOCK.